(12) United States Patent
Jensen

(10) Patent No.: US 7,963,568 B2
(45) Date of Patent: Jun. 21, 2011

(54) APPARATUS AND METHOD FOR REPAIRING A CORE SPRAY LINE ELBOW WELD JOINT

(75) Inventor: Grant Clark Jensen, Morgan Hill, CA (US)

(73) Assignee: GE-Hitachi Nuclear Energy Americans LLC, Wilmington, NC (US)

( * ) Notice: Subject to any disclaimer, the term of this patent is extended or adjusted under 35 U.S.C. 154(b) by 718 days.

(21) Appl. No.: 11/941,335

(22) Filed: Nov. 16, 2007

(65) Prior Publication Data

US 2009/0127415 A1    May 21, 2009

(51) Int. Cl.
*F16L 43/00*    (2006.01)
(52) U.S. Cl. ............ 285/191; 285/179; 285/420; 269/45
(58) Field of Classification Search ............. 285/15, 285/191, 197, 179, 180, 288.5, 288.6, 288.8, 285/288.9, 289.2, 286.2, 420, 289.3; 138/97; 411/128, 326, 978; 269/45, 43, 95, 76, 126; 403/150, 151; 312/111, 140
See application file for complete search history.

(56) References Cited

U.S. PATENT DOCUMENTS

| | | | | |
|---|---|---|---|---|
| 20,550 A | * | 6/1858 | Carr | 285/191 |
| 506,485 A | * | 10/1893 | Fichtner | 411/978 |
| 526,088 A | * | 9/1894 | Savill | 285/191 |
| 941,652 A | * | 11/1909 | Rock | 285/180 |
| 1,575,432 A | * | 3/1926 | Lewis | 285/179 |
| 2,321,417 A | * | 6/1943 | Pepersack | 285/191 |
| 2,460,352 A | * | 2/1949 | Jensen | 285/179 |
| 5,521,951 A | | 5/1996 | Charnley et al. | |
| 5,530,219 A | | 6/1996 | Offer et al. | |
| 5,602,887 A | | 2/1997 | Jensen | |
| 5,623,525 A | | 4/1997 | Jensen | |
| 5,642,955 A | | 7/1997 | Jensen | |
| 5,646,969 A | | 7/1997 | Jensen | |
| 5,675,619 A | | 10/1997 | Erbes et al. | |
| 5,699,397 A | | 12/1997 | Jensen | |
| 5,802,686 A | | 9/1998 | Erbes et al. | |
| 5,905,771 A | | 5/1999 | Erbes et al. | |
| 5,947,529 A | | 9/1999 | Jensen | |
| 6,131,962 A | | 10/2000 | Jensen et al. | |
| 6,201,847 B1 | | 3/2001 | Jensen et al. | |
| 6,345,084 B1 | | 2/2002 | Jensen | |
| 6,375,130 B1 | | 4/2002 | Jensen et al. | |
| 6,421,406 B1 | | 7/2002 | Jensen | |
| 6,456,682 B1 | | 9/2002 | Jensen | |
| 6,857,814 B2 | | 2/2005 | Jensen | |
| 7,203,263 B2 | | 4/2007 | Jensen | |

* cited by examiner

*Primary Examiner* — James M Hewitt
*Assistant Examiner* — Jay R Ripley
(74) *Attorney, Agent, or Firm* — Nixon & Vanderhye P.C.

(57) ABSTRACT

An elbow clamp assembly structurally supports or replaces a connection between a main pipe and an elbow pipe. The elbow clamp assembly includes an upper clamp body and a lower clamp body securable on opposite sides of the main pipe in facing relation. The upper and lower clamp bodies are connected by a clamp bolt extendable through the main pipe. An elbow boss is securable to the elbow pipe, and a cross bolt is extendable through the elbow pipe and connected between the elbow boss and the clamp bolt.

13 Claims, 7 Drawing Sheets

APPARATUS AND METHOD FOR REPAIRING A CORE SPRAY LINE ELBOW WELD JOINT

BACKGROUND OF THE INVENTION

The invention relates generally to an elbow weld joint and, more particularly to an apparatus and method for repairing or structurally replacing a core spray line elbow weld joint in a boiling water nuclear reactor.

A core spray piping system in operating boiling water reactors is typically of welded construction. The welds in the core spray system piping, however, are susceptible to intergranular stress corrosion cracking (IGSCC). As a consequence, the welded elbow joint in the core spray line can become cracked.

Common to most operating reactors, the core spray cooling water is delivered to the reactor core region by piping internal to the reactor vessel. A portion of this internal piping is a horizontal segment that follows the radius of curvature of the reactor vessel wall. An exemplary core spray line 2 is shown in FIG. 1. The proximal end of the horizontal piping is connected to a T-box at the core spray nozzle penetration. The distal end of this horizontal core spray line 2 is welded to a short radius elbow. The weld joining the distal end of the core spray line to the short radius elbow is designated as the P4a weld 4, and the weld joining the short radius elbow to the downcomer pipe 6 is designated as the P4b weld.

In the event that cracking should occur in the P4a weld, the structural integrity of the core spray line, which delivers cooling water to the reactor core, would be lost. A preemptive repair would be desirable to prevent separation of the P4a weld in the event that circumferential through-wall cracking should occur at this weld location in the core spray line.

BRIEF DESCRIPTION OF THE INVENTION

In an exemplary embodiment, an elbow clamp assembly structurally supports or replaces a connection between a main pipe (straight or curved) and an elbow pipe. The elbow clamp assembly includes an upper clamp body and a lower clamp body securable on opposite sides of the main pipe in facing relation. The upper and lower clamp bodies are connected by a clamp bolt extendable through the main pipe. An elbow boss is securable to the elbow pipe, and a cross bolt is extendable through the elbow pipe and connected between the elbow boss and the clamp bolt.

In another exemplary embodiment, the elbow clamp assembly includes a locking mechanism coupled with one of the upper and lower clamp bodies and engageable with a head of the clamp bolt, and a securing mechanism attached to the elbow boss, where the securing mechanism is engageable with a head of the cross bolt.

In yet another exemplary embodiment, a method of structurally supporting or replacing a connection between a main pipe (straight or curved) and an elbow pipe using an elbow clamp assembly includes the steps of forming a first aperture through the main pipe and the elbow pipe in a joint area; securing the upper clamp body and the lower clamp body on opposite sides of the main pipe in facing relation; connecting the upper and lower clamp bodies by a clamp bolt extendable through the first aperture; forming a second aperture through the elbow pipe; securing the elbow boss to the elbow pipe by extending the cross bolt through the second aperture and connecting the cross bolt to the clamp bolt.

DETAILED DESCRIPTION OF THE INVENTION

A clamping device is described herein that structurally supports or replaces a connection between a main pipe (straight or curved to be concentric with the cylindrical inside surface of the reactor vessel) and an elbow pipe and, in particular, replaces the P4a weld that joins the core spray horizontal pipe to the short radius elbow in a boiling water nuclear reactor. The clamping device is applicable to reactor plants with varying sized core spray lines.

Figure 1:
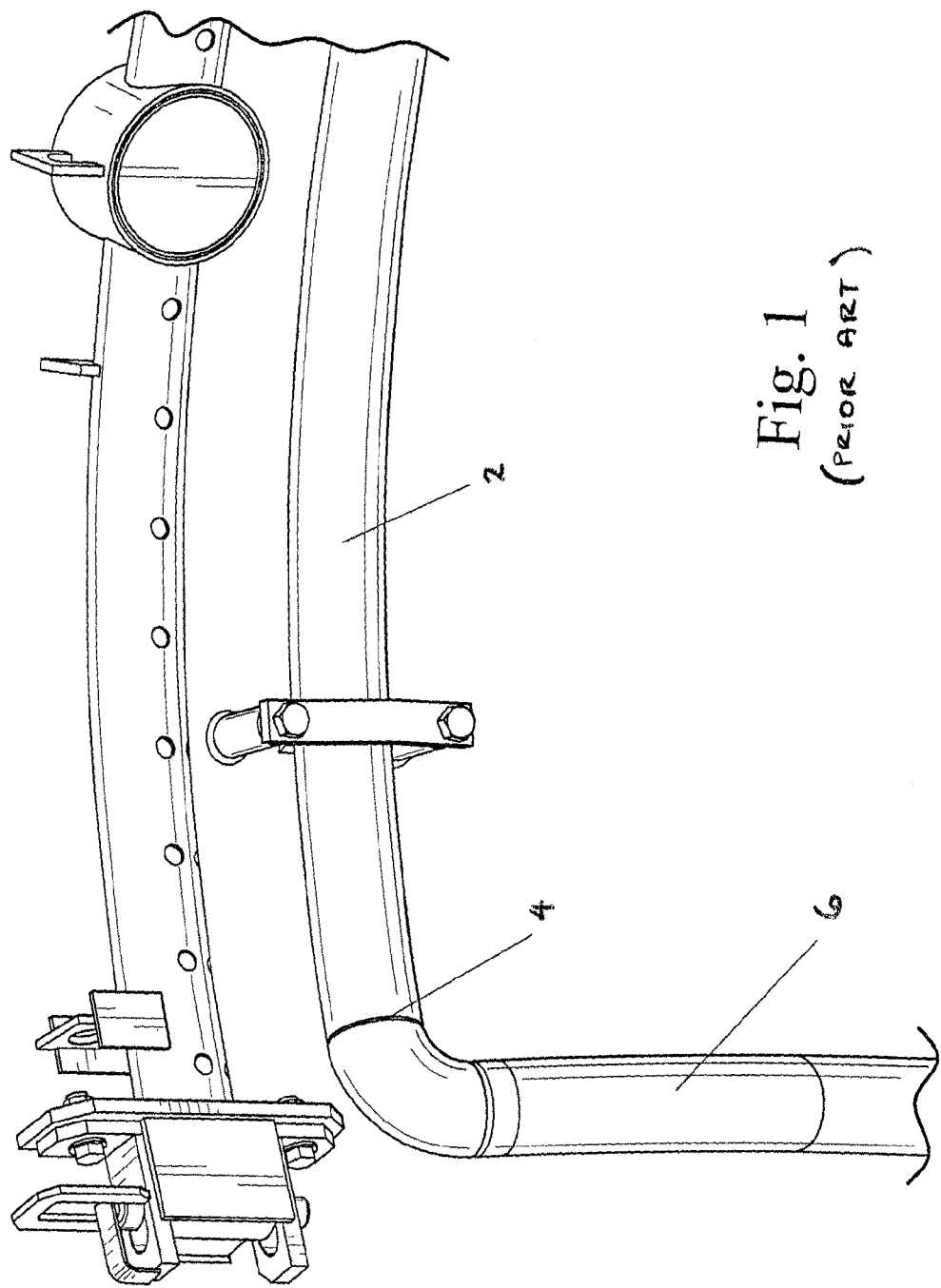
FIG. 1 shows a horizontal segment of internal piping for delivering core spray cooling water to the reactor core region.
Figure 2:
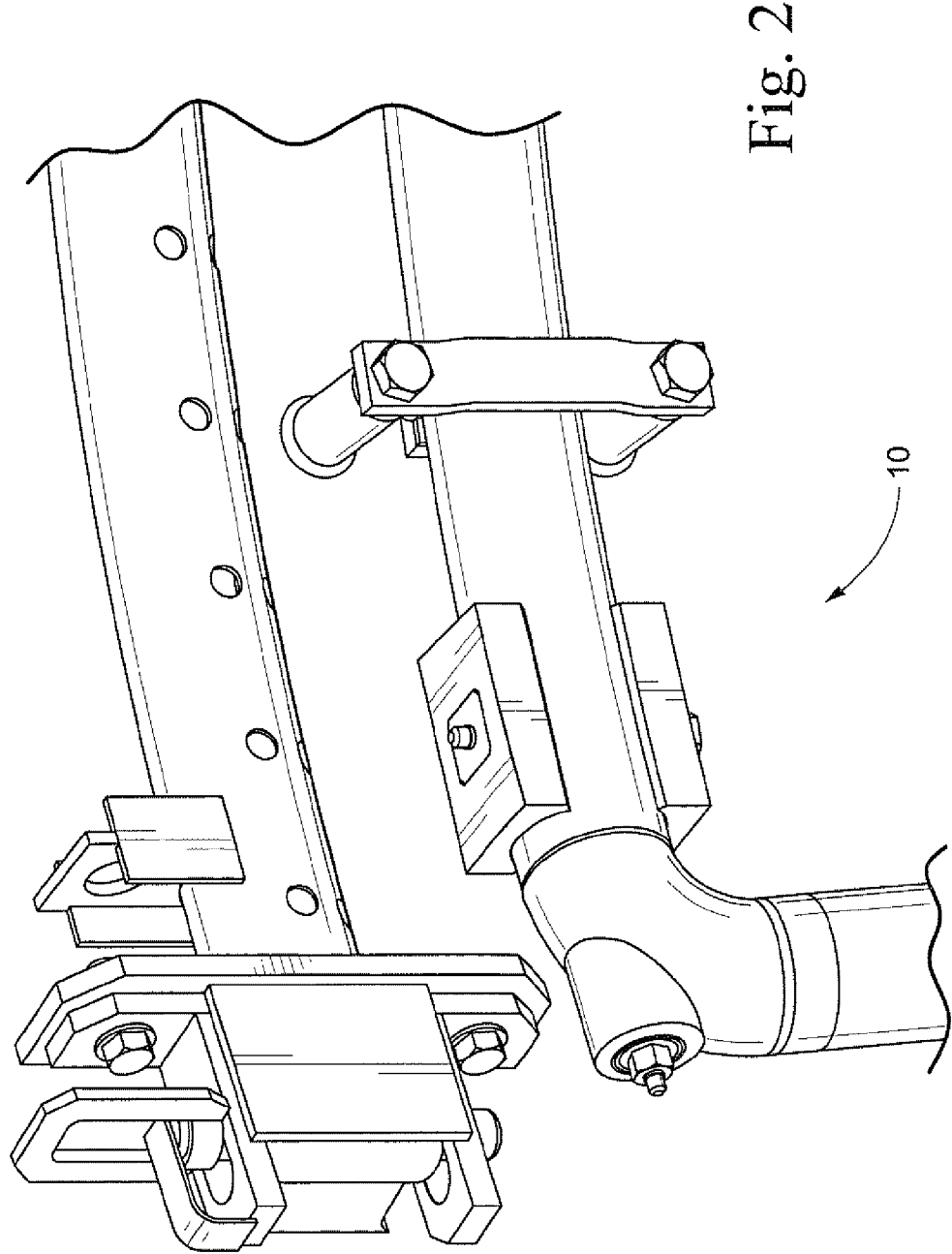
FIG. 2 is a perspective view of the core spray line with an elbow clamp installed.
Figure 3:
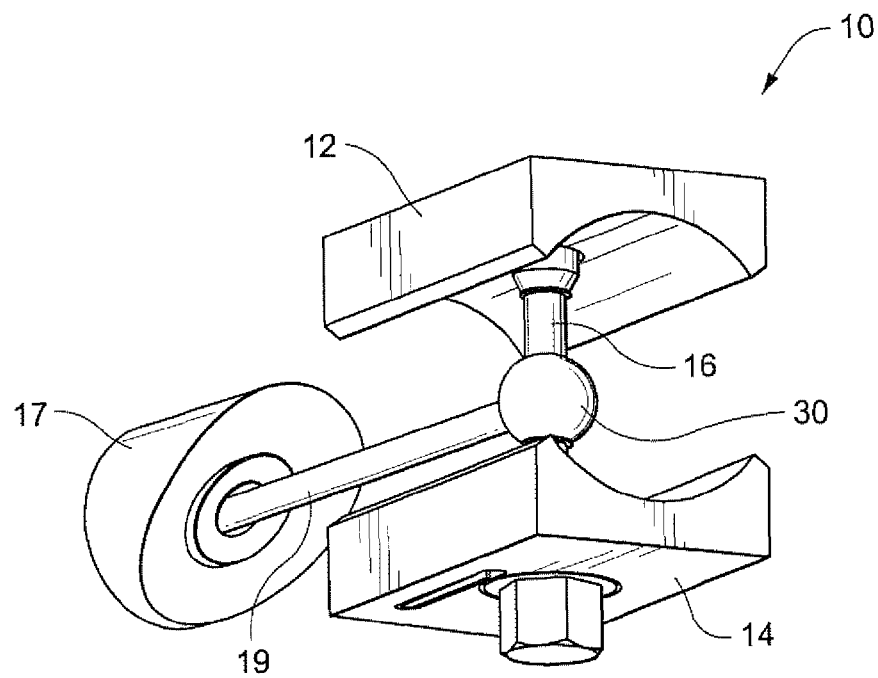
FIGS. 3 and 4 are isometric views of the elbow clamp assembly.
Figure 4:
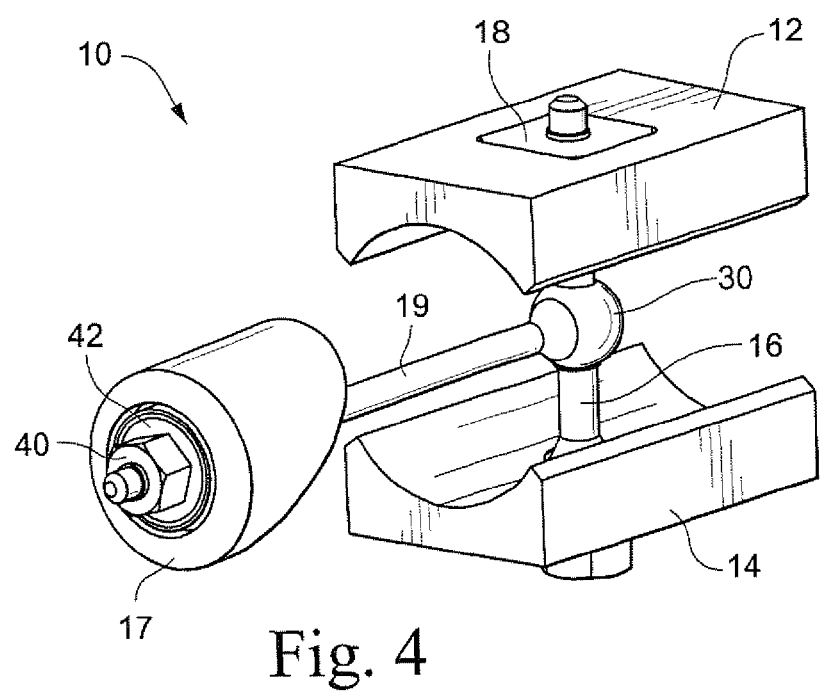

FIG. 2 shows the elbow clamp assembly 10 installed on the core spray line. FIGS. 3 and 4 are isometric views of the elbow clamp assembly 10. The elbow clamp assembly 10 includes an upper clamp body 12 and a lower clamp body 14, which interface with the horizontal section of the core spray line. The clamp bodies 12, 14 are held in position on the horizontal pipe by a clamp bolt 16, which passes through holes formed in the horizontal pipe, and a clamp bolt nut 18 threaded on an end of the clamp bolt 16. An elbow boss 17 is securable to the elbow pipe, and a cross bolt 19 is extendable through the elbow pipe and connected between the elbow boss 17 and the clamp bolt 16.

The outside diameter of the core spray line can vary within specified manufacturing tolerances. Also, a curved pipe that has been formed will most likely be slightly oval in cross-section. As such, the radius of curvature machined into the upper and lower clamp bodies 12, 14 is slightly smaller than the nominal radius of curvature of the piping. This ensures that the clamp bodies 12, 14 will interface properly with the core spray line.

Figure 5:
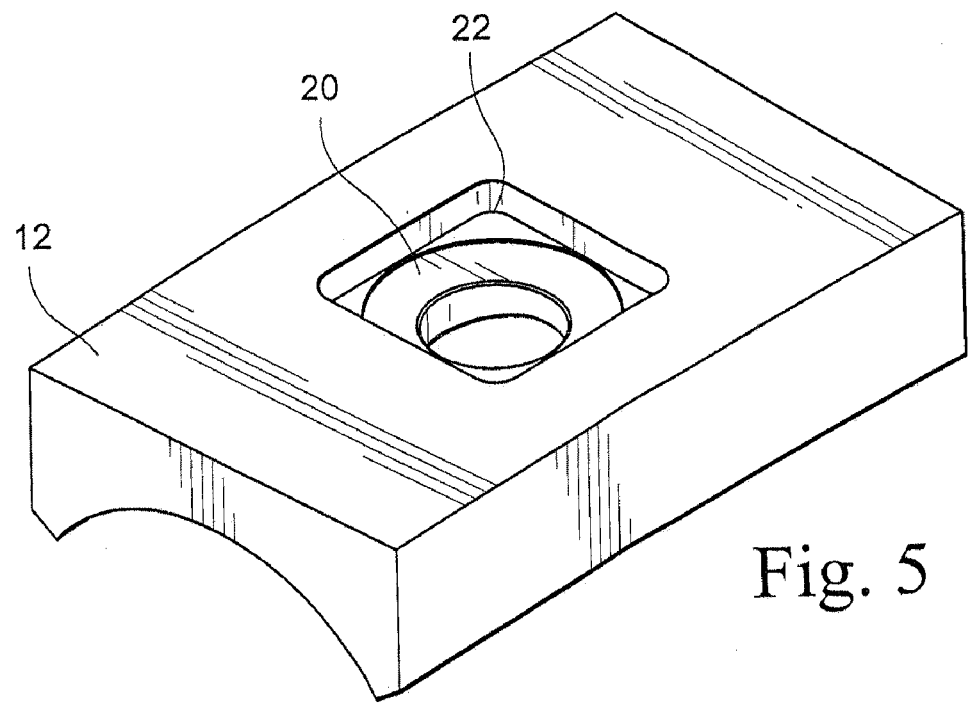
FIG. 5 shows the upper clamp body.
Figure 6:
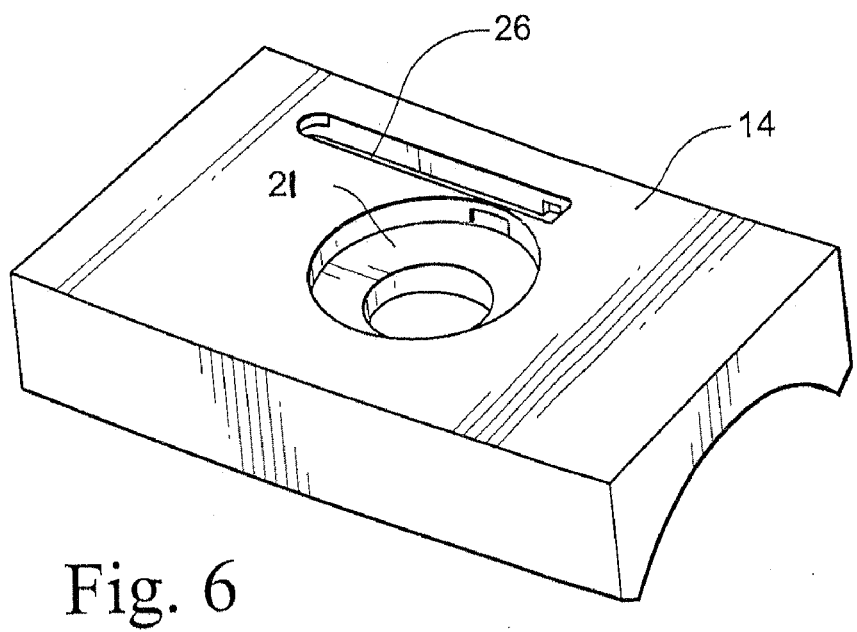
FIG. 6 shows the lower clamp body.

Both the upper and lower clamp bodies 12, 14 feature spherical seating surfaces 20, 21 which mate with spherical seating surfaces of the clamp bolt nut 18 and clamp bolt 16, respectively (see FIGS. 5 and 6). In addition, the upper clamp body 12 incorporates a shaped (non-circular, preferably square) machined depression 22, which interfaces with the clamp bolt nut 18 to prevent rotation of the clamp bolt nut 18. The upper and lower clamp bodies 12, 14 are machined to interface with a curved pipe (i.e., the machined surface has a radius of curvature in the plane defined by the curved pipe and a much smaller radius of curvature to conform to the pipe diameter).

Figure 7:
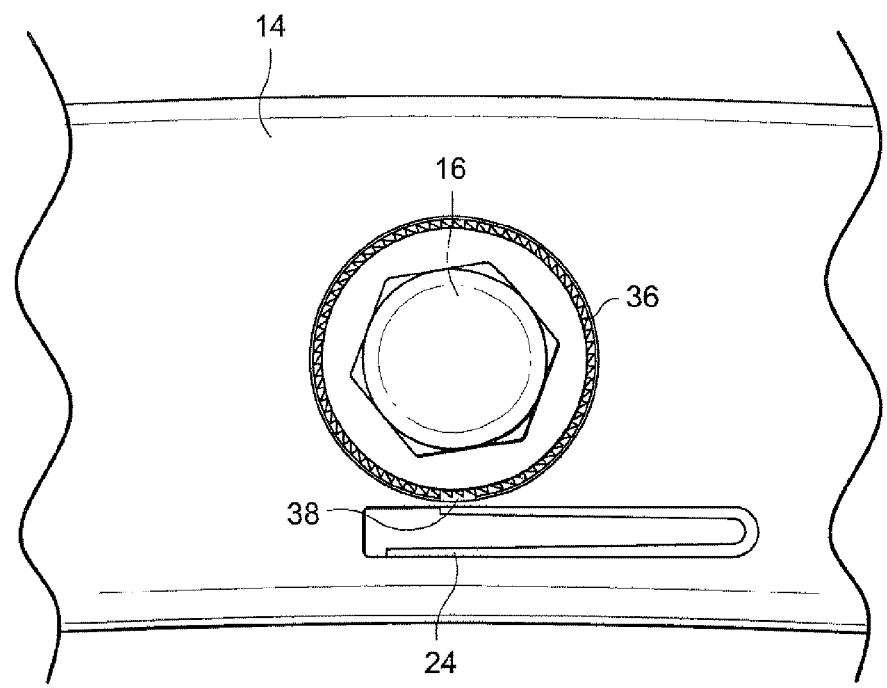
FIG. 7 shows the lower clamp body with a clamp bolt keeper in place.

The lower clamp body 14 houses a clamp bolt keeper 24 (FIG. 7), which resides in a machined depression 26 in the lower clamp body 14. The clamp bolt keeper 24 is held captive at three separate locations by interfacing features shared by the keeper 24 and the lower clamp body 14. The function of the clamp bolt keeper 24 is to prevent rotation of the clamp bolt 16 and thus retain clamp bolt preload (described in more detail below).

The clamp bolt nut 18 internal threads mate with external threads of the clamp bolt 16. The nut 18 has a generally square shape and a spherical seating surface, which interface with the upper clamp body 12. A distal end of the clamp bolt 16 is machined to a diameter slightly smaller than the minor thread diameter of the clamp bolt nut 18 in order to facilitate remote installation of the clamp bolt nut 18.

Figure 8:
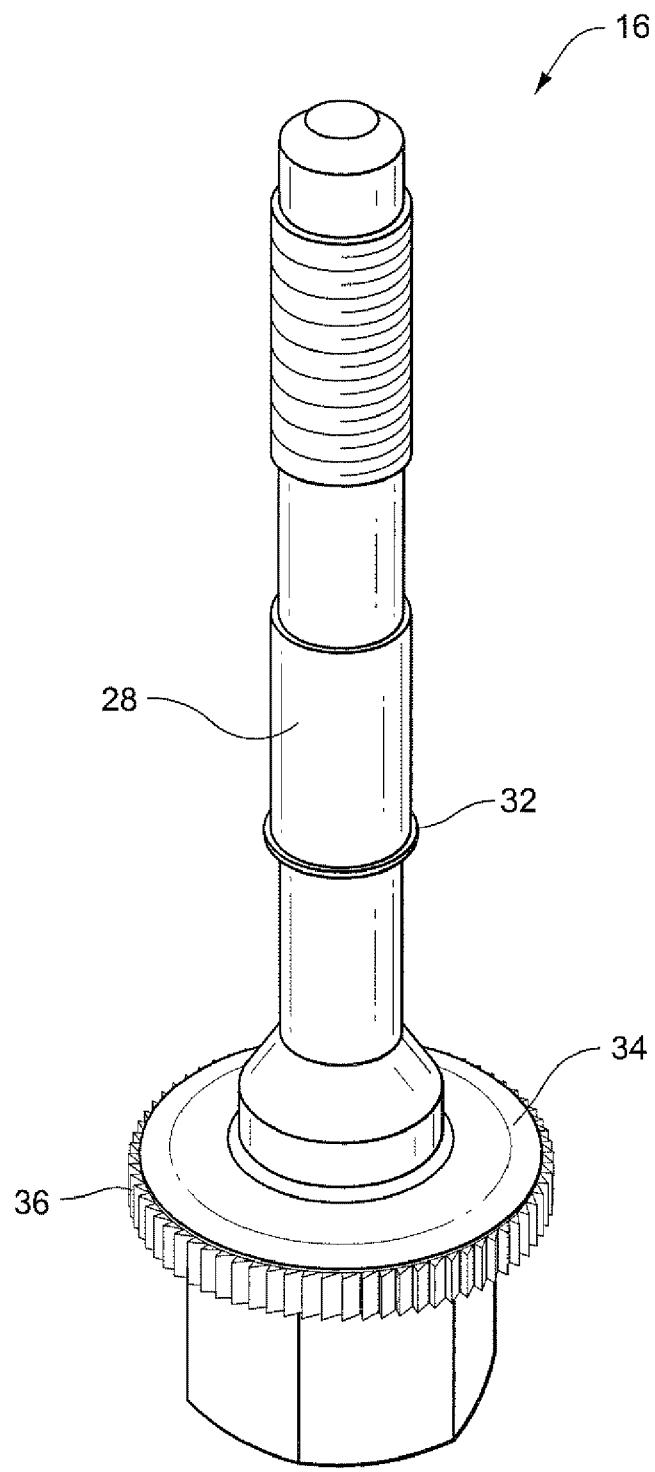
FIG. 8 shows the clamp bolt.

With reference to FIG. 8, the center of the clamp bolt shaft includes a section 28 with increased diameter. This section 28 interfaces with a head 30 of the cross bolt 19. Integral with this central section 28 is a small lip or flange 32 that ensures proper positioning of the cross bolt 19 relative to the clamp bolt 16, as the head 30 of the cross bolt 19 rests on the raised lip 32 when installed.

A proximal end of the clamp bolt 16 incorporates a spherical seating surface 34 and ratchet teeth 36, which interface with the lower clamp body 14 and teeth 38 of the clamp bolt keeper 24, respectively. The clamp bolt keeper 24 is preferably shaped like a hairpin, which consists of essentially two cantilever beams joined at one end. There are retaining features at the free end of the first and second cantilever beams and also at the common end where both beams are joined together. In addition, the retaining feature at the end of the first cantilever beam also incorporates the teeth 36 that interface with the teeth 38 of the clamp bolt 16 and function to limit rotation of the clamp bolt 16 to the direction that increases bolt preload (i.e., prevents the clamp bolt from losing bolt preload).

The head or distal end 30 of the cross bolt 19 interfaces with the clamp bolt 16. This end of the cross bolt 19 is preferably spherical in shape so as to minimize fluid flow resistance of the core spray flow stream. The proximal end of the cross bolt 19 is designed with external threads, which mate with the internal threads of a cross bolt nut 40. The extreme distal end of the cross bolt 19 is preferably machined to a diameter slightly less than the minor thread diameter of the cross bolt nut 40, thus forming a lead-in that facilitates remote installation of the cross bolt nut 40.

Figure 9:
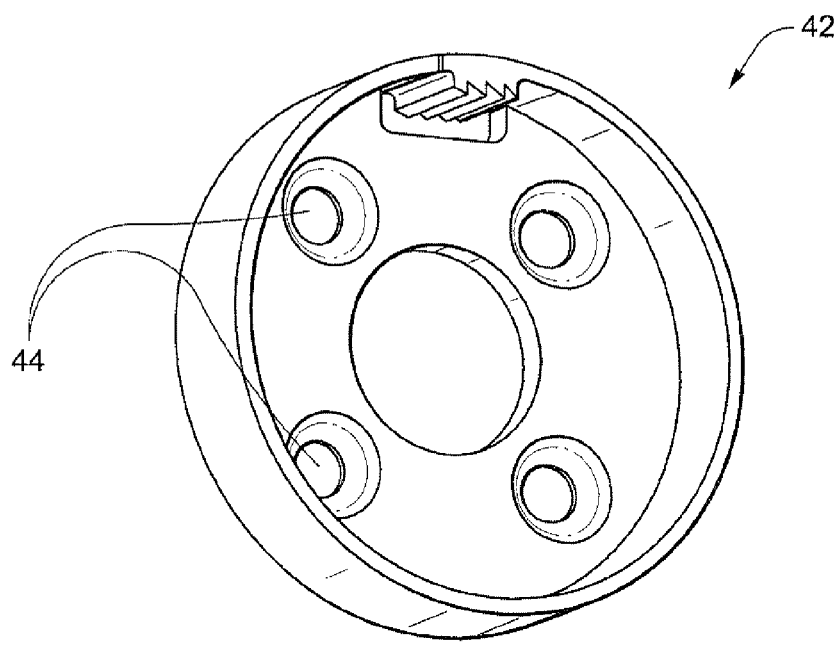
FIG. 9 shows a cross bolt nut keeper.

The cross bolt nut 40 bears on a cross bolt nut keeper 42 shown in FIGS. 4 and 9, which is fastened by four flat head screws to the elbow boss 17 through apertures 44. The opposite end of the elbow boss 17 is machined to the shape of the external surface of the short radius elbow of the core spray line with the exception of a sleeve protuberance, which interfaces with a machined hole in the short radius elbow of the core spray line. This feature keys or restrains the elbow boss 17 to the short radius elbow and thus prevents unwanted movement of the elbow boss 17, which would in turn impose unwanted bending loads on the cross bolt 19.

Figure 10:
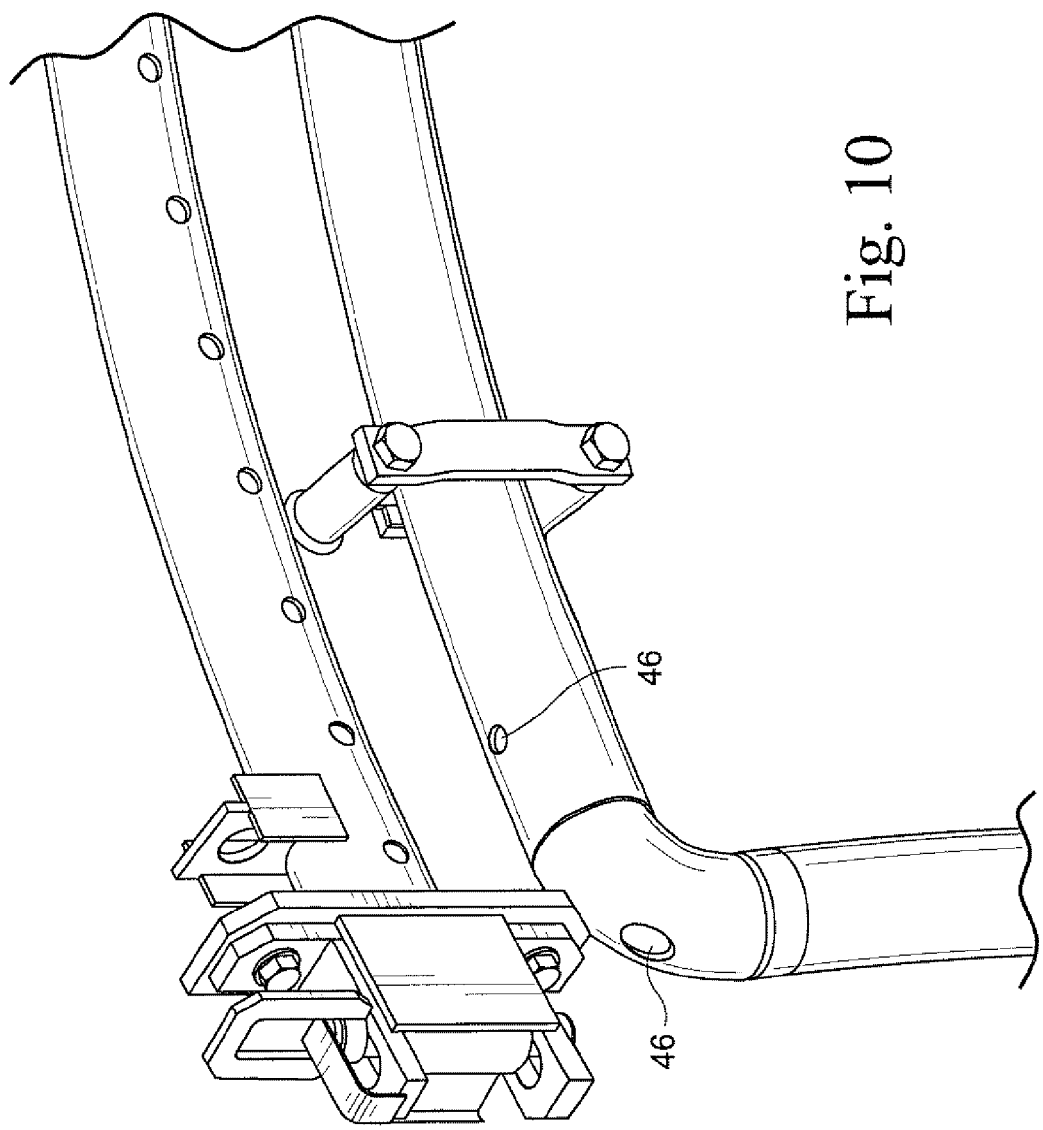
FIG. 10 illustrates a step in the installation method.

Installation of the elbow clamp assembly 10 is performed by first machining holes 46 via EDM (electric discharge machining) or the like in the short radius elbow and the horizontal piping segment as shown in FIG. 10. The cross bolt 19 is inserted through the hole provided in the short radius elbow. The lower clamp body 14, clamp bolt keeper 24 and clamp bolt 16 are then brought together as an assembly on the underneath side of the core spray line. The distal end of the clamp bolt 16 is inserted through the hole provided in the underneath side of the horizontal piping, engaging the hole in the head 30 of the cross bolt 19, and finally emerging from the hole provided in the top side of the horizontal piping. The upper clamp body 12 and clamp bolt nut 18 are then positioned over the distal end of the clamp bolt 16.

The clamp bolt 16 is then rotated to engage the threads of the clamp bolt nut 18, and the clamp bolt 16 is tightened to a nominal preload. The elbow boss 17 with the cross bolt keeper 42 attached is positioned over the proximal end of the cross bolt 19 followed by the cross bolt nut 40. The cross bolt nut 40 is threaded onto the cross bolt 19 and tightened to a nominal preload. Finally, the clamp bolt 16 and cross bolt nut 40 are preloaded to their final specified values.

The described elbow clamp assembly supports or structurally replaces the P4a weld that joins the core spray horizontal pipe to the short radius elbow in a boiling water nuclear reactor. The clamp assembly can be remotely installed and is applicable to reactor plants with varying sized core spray lines.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. An elbow clamp assembly that structurally supports or replaces a connection between a main pipe and an elbow pipe, the elbow clamp assembly comprising:
   an upper clamp body and a lower clamp body, the upper clamp body and the lower clamp body being securable to the outer surface of the main pipe on opposite sides of the main pipe in facing relation, the upper and lower clamp bodies being connected to each other by a clamp bolt extendable through holes in the main pipe;
   an elbow boss detachably securable to the elbow pipe, wherein a side of the elbow boss facing the elbow pipe is inverse cylindrical shaped to facilitate a connection with the external surface of the elbow pipe; and
   a cross bolt extendable through a hole in the elbow pipe and connected at one end to the elbow boss and at an opposite connecting end to the clamp bolt, the clamp bolt extending through a hole in the connecting end.

2. An elbow clamp assembly according to claim 1, wherein an inside surface facing the main pipe of each of the upper and lower clamp bodies is curved to facilitate engagement with the main pipe.

3. An elbow clamp assembly according to claim 1, wherein the upper clamp body comprises a shaped depression, the shaped depression receiving a complementary shaped clamp bolt nut engageable with the clamp bolt, wherein the shaped depression prevents rotation of the clamp bolt nut.

4. An elbow clamp assembly according to claim 3, wherein the lower clamp body comprises a machined depression that is shaped to receive a head of the clamp bolt, and a slot depression disposed adjacent the machined depression, the elbow clamp assembly further comprising a clamp bolt keeper that is received in the slot depression and is engageable with the clamp bolt head to retain a preload on the clamp bolt.

5. An elbow clamp assembly according to claim 4, wherein the shaped depression in the upper clamp body comprises a spherical seating surface that is shaped corresponding to a spherical seating surface of the clamp bolt nut, and wherein the machined depression in the lower clamp body comprises a spherical seating surface that is shaped corresponding to a spherical seating surface of the clamp bolt head.

6. An elbow clamp assembly according to claim 4, wherein the clamp bolt head comprises ratchet teeth around a perimeter thereof, the ratchet teeth engaging corresponding teeth on the clamp bolt keeper when the clamp bolt keeper is received in the slot depression.

7. An elbow clamp assembly according to claim 6, wherein the corresponding teeth and the ratchet teeth are configured to limit rotation of the clamp bolt to a direction that increases the preload on the clamp bolt.

8. An elbow clamp assembly according to claim 1, wherein the clamp bolt comprises an increased diameter section with which the cross bolt interfaces.

9. An elbow clamp assembly according to claim 8, wherein the increased diameter section comprises a flange at an end thereof, the flange ensuring proper positioning of the cross bolt relative to the clamp bolt.

10. An elbow clamp assembly according to claim 1, wherein the connecting end is shaped to minimize fluid flow resistance.

11. An elbow clamp assembly according to claim 1, wherein a cross bolt nut keeper is secured to the elbow boss, and wherein the cross bolt is secured between the elbow boss and the clamp bolt by a cross bolt nut, the cross bolt nut being received in the cross bolt nut keeper, the cross bolt nut and the cross bolt nut keeper including locking structure that serves to retain a preload on the cross bolt.

12. An elbow clamp assembly according to claim 1, wherein the elbow boss comprises a sleeve protuberance that is structured to interface with a machined surface of the hole in the elbow pipe, the interface serving to positively position the elbow boss in relation to the elbow pipe.

13. An elbow clamp assembly that structurally supports or replaces a connection between a main pipe and an elbow pipe, the elbow clamp assembly comprising:
   an upper clamp body and a lower clamp body, the upper clamp body and the lower clamp body being securable to the outer surface of the main pipe on opposite sides of the main pipe in facing relation, the upper and lower clamp bodies being connected to each other by a clamp bolt extendable through holes in the main pipe;
   a locking mechanism coupled with one of the upper and lower clamp bodies and engageable with a head of the clamp bolt to limit rotation of the clamp bolt to a single direction;
   an elbow boss detachably securable to the elbow pipe, wherein a side of the elbow boss facing the elbow pipe is inverse cylindrical shaped to facilitate a connection with the external surface of the elbow pipe;
   a cross bolt extendable through a hole in the elbow pipe and connected at one end to the elbow boss and at an opposite connecting end to the clamp bolt, the clamp bolt extending through a hole in the connecting end; and
   a securing mechanism attached to the elbow boss, the securing mechanism being engageable with a head of the cross bolt to limit rotation of the clamp bolt to a single direction.

\* \* \* \* \*

UNITED STATES PATENT AND TRADEMARK OFFICE
CERTIFICATE OF CORRECTION

| | | |
|---|---|---|
| PATENT NO. | : 7,963,568 B2 | |
| APPLICATION NO. | : 11/941335 | |
| DATED | : June 21, 2011 | |
| INVENTOR(S) | : Jensen | |

It is certified that error appears in the above-identified patent and that said Letters Patent is hereby corrected as shown below:

Column 2, lines 50-54, "The upper and lower clamp bodies 12, 14 are machined to interface with a curved pipe (i.e., the machined surface has a radius of curvature in the plane defined by the curved pipe and a much smaller radius of curvature to conform to the pipe diameter)." should read
--The upper and lower clamp bodies 12, 14 are preferably machined to interface with a curved pipe (i.e., the machined surface follows or mimics the curvature of the pipe in the plane defined by the curved pipe).--

Signed and Sealed this
Sixteenth Day of August, 2011

David J. Kappos
*Director of the United States Patent and Trademark Office*